United States Patent [19]

[11] 3,838,459

Bettini et al.

[45] Sept. 24, 1974

[54] APPARATUS FOR RECORDING AND/OR PLAYING BACK A MAGNETIC TAPE CONTAINED IN A CASSETTE

[75] Inventors: Giuseppe Bettini, Ivrea; Carlo Romano, Dora, both of Italy

[73] Assignee: Ing. C. Olivetti & C., S.p.A., Ivrea, Italy

[22] Filed: Jan. 26, 1972

[21] Appl. No.: 220,992

[30] Foreign Application Priority Data

Jan. 28, 1974 Italy ................................ 67277/71

[52] U.S. Cl. .................................................. 360/96
[51] Int. Cl. .......................................... G11b 15/26
[58] Field of Search ........................... 274/4 C, 4 D; 242/198–201; 226/186, 187

[56] References Cited

UNITED STATES PATENTS

| | | | |
|---|---|---|---|
| 2,943,852 | 7/1960 | Quirk | 226/187 |
| 3,115,314 | 12/1963 | Manley et al. | 226/186 |
| 3,547,372 | 12/1970 | Barnett | 226/186 |
| 3,612,432 | 10/1971 | Johnson | 242/198 |
| 3,664,672 | 5/1972 | Fujikawa et al. | 224/4 D |

FOREIGN PATENTS OR APPLICATIONS

| | | | |
|---|---|---|---|
| 1,254,377 | 11/1967 | Germany | 274/4 C |

*Primary Examiner*—Harry N. Haroian

[57] ABSTRACT

The apparatus is used for recording and/or playing back a magnetic tape contained in a cassette provided with locating holes extending through its thickness and with apertures disposed along at least one of its edges through which the exposed tape can be engaged by the elements entraining the tape and by a transducer. The apparatus comprises a supporting chassis on which are mounted the entraining elements, the transducer and means adapted to locate the tape cassette on the chassis by acting on the outer faces of the cassette and on the locating holes. The entraining elements consist of a first and a second pair of rollers, each pair comprising a driving and a driven roller, each pair acting selectively to transport the tape forward and backward respectively. The apparatus further comprises an actuating device adapted to move both the driven rollers simultaneously into the proximity of the respective driving rollers and to move the transducer into contact with the tape, and a selectively actuable mechanism for bringing the selected driven roller into pressure contact with the respective driving roller. Means are also provided for imparting a rotary movement to the selected driving roller after it has been engaged by the corresponding driven roller.

9 Claims, 6 Drawing Figures

APPARATUS FOR RECORDING AND/OR PLAYING BACK A MAGNETIC TAPE CONTAINED IN A CASSETTE

FIELD OF THE INVENTION

The present invention relates to an apparatus for recording and/or playing back a magnetic tape contained in a cassette of known type.

DESCRIPTION OF THE PRIOR ART

In the type of cassette, known commercially as a "musi-cassette" the tape is wound on two coplanar spools each provided with a central hole through a ring which projects inside a through hole formed in the thickness of the cassette itself, by means of which ring each spool can engage with the tape winding elements of the apparatus. The cassette is generally provided in its front portion with locating holes extending through its thickness for the positioning thereof, and with apertures disposed along at least one of its edges through which the exposed tape can be engaged by the elements entraining and recording and/or playing back the tape.

The object of the present invention is to provide apparatus which utilizes readily handleable and cheap tape records, as are the aforesaid cassettes, for recording and/or playing back digital information.

An apparatus for recording and/or playing back a magnetic tape contained in a cassette is known in which the feed of the tape is obtained by means of a driving roller or capstan housed inside one of said holes and co-operating with a driven roller which keeps the interposed tape pressed against the driving roller.

In this type of apparatus, the driving roller is constantly in rotation and when the feed of the tape is to be effected the driven roller is caused to bear against the driving roller. In this way, however, the tape is subjected to sudden snatching or jerking in the starting phase, the inertia of the wind-off spool being fairly great; moreover, the tape, coming into contact with the constantly rotating driving roller, is subjected to prolonged rubbing in the starting phase, with consequent damage to the magnetic track.

BACKGROUND OF THE INVENTION

In order to overcome these drawbacks, the present invention provides apparatus for recording and/or playing back a magnetic tape contained in a cassette provided with locating holes extending through its thickness and with apertures disposed along at least one of its edges through which the exposed tape can be engaged by the elements entraining the tape and a transducer comprising a supporting chassis on which are mounted the entraining elements, the transducer and means adapted to locate the tape cassette on the chassis by acting on the outer faces of the cassette and on the locating holes, the said entraining elements consisting of a first and a second pair of rollers, each pair comprising a driving and a driven roller, which pairs act selectively to transport the tape forward and backward respectively, and the apparatus further comprising an actuating device adapted to move both the driven rollers simultaneously into the proximity of the respective driving rollers and to move the transducer into contact with the tape, and selectively actuable mechanisms for bringing the selected driven roller into pressure contact with the respective driving roller, and means for imparting rotary movement to the selected driving roller after it has been engaged by the corresponding driven roller.

BRIEF DESCRIPTION OF THE DRAWINGS

A preferred embodiment of the invention is presented by way of example in the following description and in the accompanying drawings, in which.

DESCRIPTION OF A PREFERRED EMBODIMENT OF THE INVENTION

Figure 1:
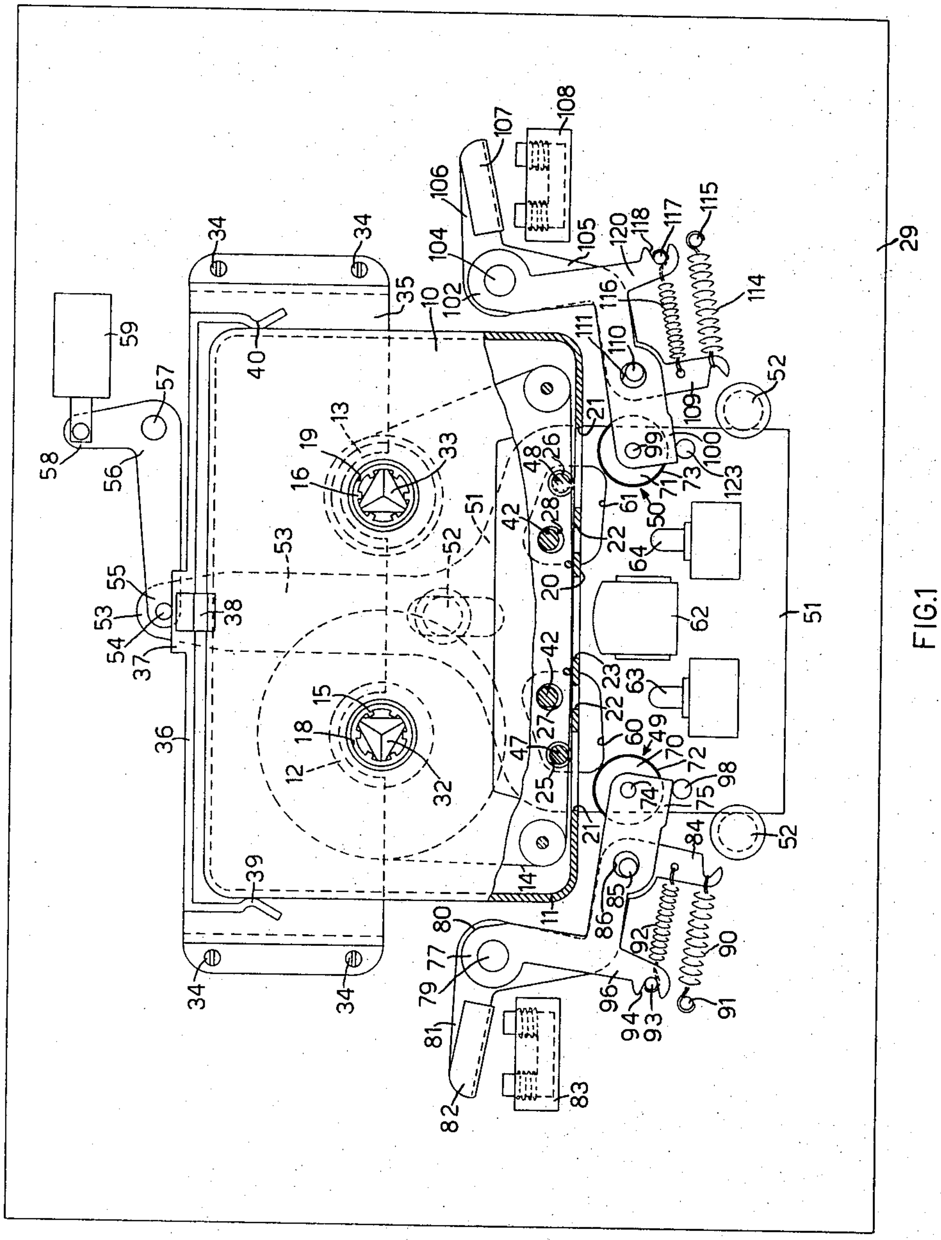
FIG. 1 is a plan view of apparatus embodying the invention in its inoperative position.

A cassette 10 of known type (FIGS. 1 and 3) comprises an outer casing 11 inside which there is arranged a magnetic tape 14, wound on two spools 12 and 13 mounted so that they are coplanar and rotatable in such manner that the tape can be transported from one to the other along a predetermined path. Each of the spools 12 and 13 has a central hole through a toothed ring 15 and 16, respectively, which projects into the space of a through hole 18 and 19, respectively, formed in the thickness of the cassette 10.

The cassette 10 is provided at its front edge 20 with a pair of entrainment apertures 21, a pair of apertures 22 for photoelectric control and a central recording and/or playback aperture 23. The tape 14 can come into contact with the feed elements and with the recording and/or playback transducer of the apparatus through the apertures 21 and 23, respectively. Moreover, the cassette 10 has in its front portion, in the proximity of and in correspondence with the apertures 21 and 22, four through holes 25 and 26 and 27 and 28 which extend through the thickness of the cassette.

The recording and/or playback apparatus comprises a horizontally disposed base 29 on which there are mounted two rotatable shafts 30 and 31 arranged with a distance between their centres which is substantially equal to that between the axes of the spools 12 and 13. The shafts 30 and 31 are shaped at the top in such a way as to have their respective ends 32 and 33 in the form of a pyramidal bush surrounded by a toothed ring adapted to mesh with the teeth 15 and 16 of the spools 12 and 13, respectively. The shaping in the form of a triangular pyramid facilitates putting on of the cassette without preliminary careful positioning.

The shafts 30 and 31 are each connected to a motor, not shown in the drawing, which is arranged below the base 29, and through the medium of the respective toothed bushes 32 and 33 which are coupled with the toothed rings 15 and 16 they are adapted to produce both the rapid winding and unwinding of the tape 14 on and from the spools 12 and 13.

Above the base 29 and fixed thereto, for example, by means of screws 34 there is arranged a horizontal platform 35 on which the cassette 10 normally rests.

Along the rear edge of the platform 35 and part of the lateral edges thereof is arranged a U-shaped frame 36 having in a substantially central position a bracket 37 supporting a resilient tongue or strip 38 bent at 45° and adapted to keep the cassette 10 constantly pressed down against the platform 35. The two ends 39 and 40 of the frame 36 form a spring clamp adapted to guide the cassette 10 during its insertion into the recording apparatus and then to keep it in a stable position.

Figure 3:
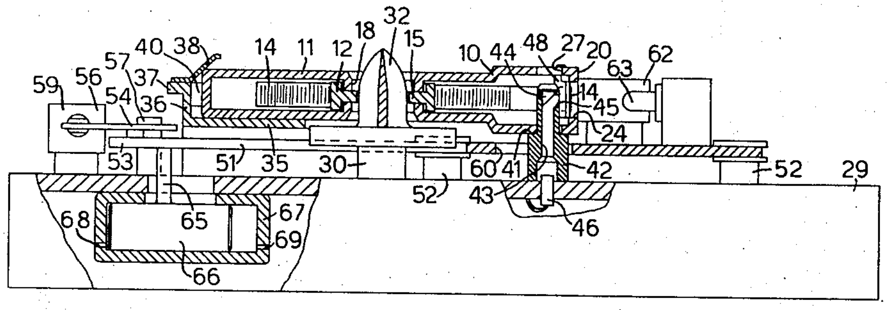
FIG. 3 is a section on the line III—III of FIG. 2.

In addition to the cassette 10 resting on the platform 35, it also rests on the shoulders 41 of two pins 42 which are housed in the holes 27 and 28, respectively, and against which the cassette is urged by the horizontal action of the resilient tongue 38 (FIG. 3).

Each pin 42 has an internal cavity 43 in the upper end of which there is arranged an optical prism 44 adapted to receive a light beam through a hole 45 formed in the side wall of the pin itself and to reflect said light beam along the axis of the cavity of the pin towards a detection device constituted by a photoresistor 46 arranged at the bottom of the cavity 43.

Figure 2:
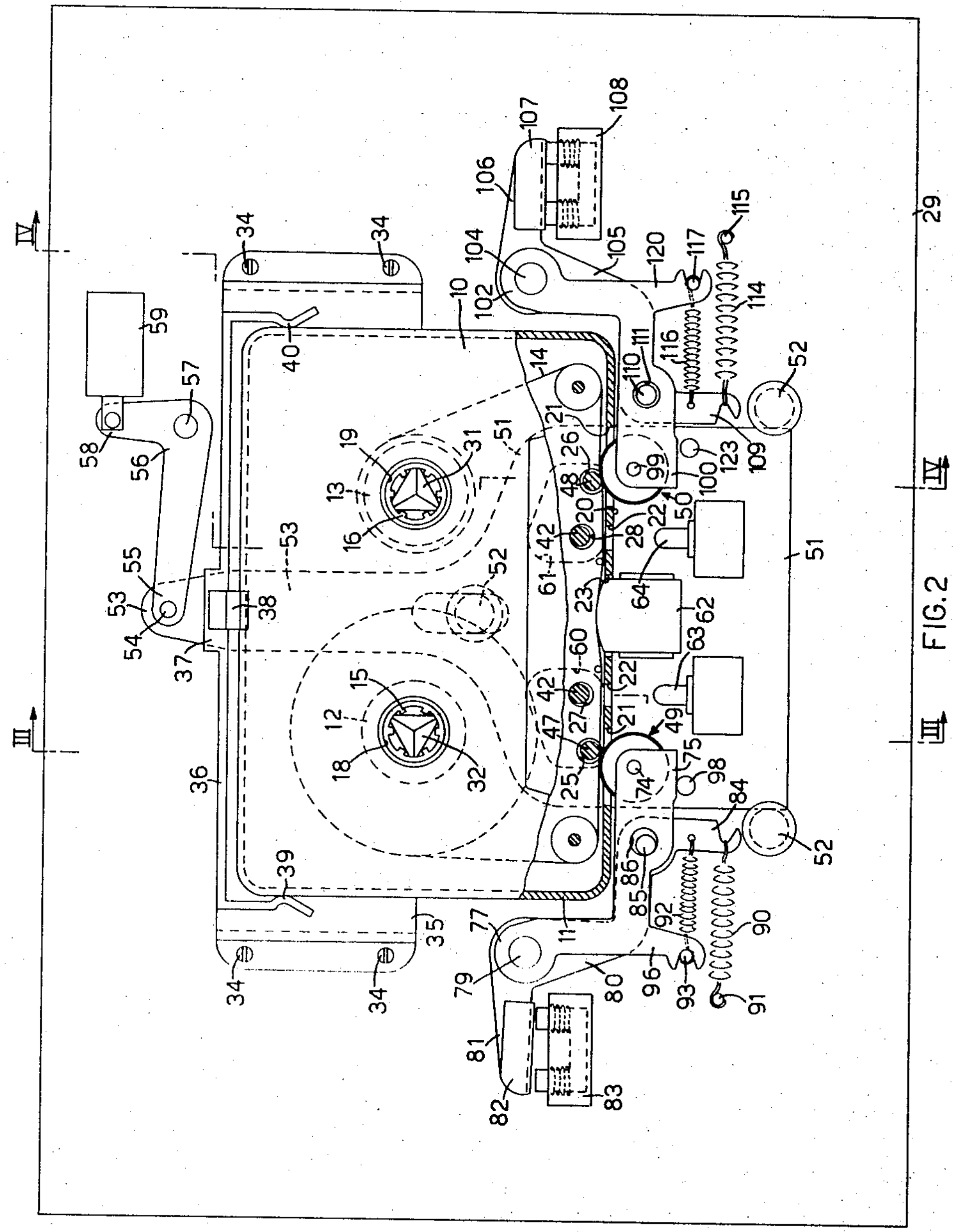
FIG. 2 is a plan view of the apparatus in its working position.

Two shafts 47 and 48 made, for example, of steel and mounted rotatably on the base 29 are normally received in the holes 25 and 26 of the cassette 10 and are each powered through a clutch 127, for example of electromagnetic type, by a driving unit not shown in the drawing. These shafts are adapted to function as driving rollers or capstans and to cooperate with two driven rollers 49 and 50, respectively, to provide for the feed of the tape 14 in both directions of movement (FIG. 2).

Between the base 29 and the platform 35 and parallel to both there is arranged an actuating plate 51 slidable on three guides 52. This plate is provided with an arm 53 arranged between the shafts 30 and 31 (FIGS. 1 and 2).

The arm 53 of the plate 51 is connected through a pin 54 to an arm 55 of a lever 56 pivoted on a shaft 57 and controlled at the other arm 58 by an electromagnet 59 mounted on the base 29.

The plate 51 is provided with two openings 60 and 61 each sufficiently wide to encircle a pin 42 and one of the shafts 47 and 48, respectively. In the central portion of this plate there are mounted a recording and/or playback head 62 arranged in correspondence with the aperture 23 of the cassette 10, and two light sources 63 and 64 arranged in correspondence with the two pins 42.

The light beams issuing from the sources 62 and 63 pass first through the apertures 22 of the cassette 10 and then through the holes 45 in the corresponding pins 42, to be picked up by the photoresistors 46 after they have been reflected by the prisms 44, that is when there is a transparent leader between the apertures 22 and the pins 42.

The arm 53 of the plate 51 is moreover connected by a rigid bridge 65 (FIG. 3) at its lower face to a piston 66 slidable inside a cylinder 67 arranged below the base 29. The cylinder 67, which is provided with two orifices 68 and 69 respectively formed in two opposite end walls for the intake and expulsion of air, constitutes together with the piston 66 a damping system adapted to slow down the speed of travel of the supporting plate 51.

Figure 4:
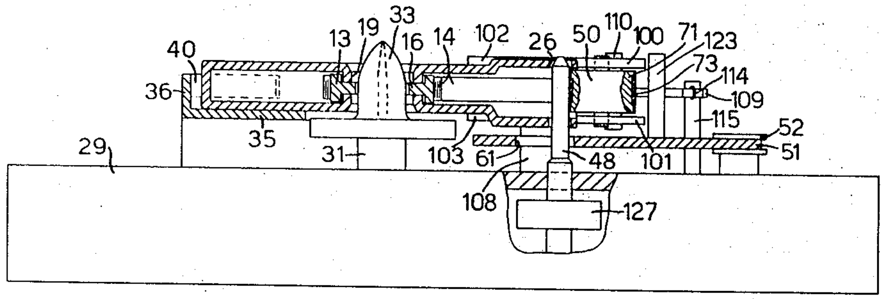
FIG. 4 is a section on the line IV—IV of FIG. 2.

Each of the driven rollers 49 and 50 has a cylindrical form of constant section and the rollers are consituted by metal cylinders 70 and 71, which have outer coverings 72 and 73 of rubbery material (FIGS. 1 and 4).

In the central zone, the cylinders 70 and 71 have a smaller section than at the edges, so that the thickness of the coverings 72 and 73 is greater in that part where the covering normally comes into contact with the tape 14, so as to promote the elastic compressibility of the covering in that part.

Figure 5:
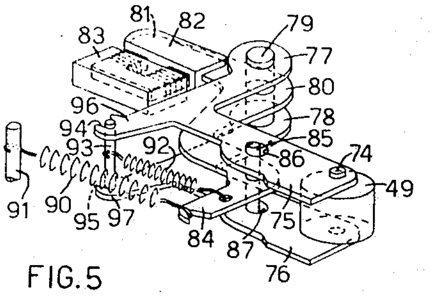
FIG. 5 is a perspective view of a first detail of the apparatus.

The supporting and control system of the driven rollers will now be described. The driven rollers 49 (FIG. 5) is pivoted by means of its pivot 74 in the two ends 75 and 76 of two supporting levers 77 and 78 disposed parallel and pivoted on a single shaft 79 fixed rigidly to the base 29. Between the two levers 77 and 78 there is arranged an intermediate lever 80 also pivoted on the shaft 79 and having an arm 81 supporting an armature 82, the position of which is controlled by an electromagnet 83 mounted on the base 29.

An arm 84 of the intermediate lever 80 rigidly supports a spindle 85 disposed perpendicularly to the plane of the lever itself and seated at its two ends in two holes 86 and 87 formed in the supporting levers 77 and 78. A first spring 90, which acts on the lever 80, supplies a resistant force for the entire system of levers controlling the driven roller 49. A second spring 92, stretched between the end of the lever arm 84 and a cylindrical bar 93 resting at its two ends in two recesses 94 and 95 belonging to the arms 96 and 97 of the supporting levers 77 and 78, respectively, enables the independent movements of these two disjointed levers to be coordinated so as to achieve a correct positioning of the driven roller 49 against the corresponding driving roller 47. In fact, the spring 92 holds the spindle 85 so that it normally bears against the inner walls of the holes 86 and 87 (FIGS. 1 and 5), while the spring 90, stretched between the arm 84 of the lever 80 and a fixed point 91 on the base 29, holds the entire assembly, and in particular the ends 75 and 76 of the levers 77 and 78, constantly backed against a pin 98 (FIG. 1). Since the levers 77 and 78 are partially disconnected from one another and since there is a considerable play between the spindle 85 and the holes 86 and 87, the driven roller 49 can tilt so as to adjust itself prefectly to the driving rollers 47 under the control of the spring 92.

The pin 98 (FIG. 1) is fixed to the actuating plate 51 and cooperates with the ends 75 and 76 of the levers 77 and 78 in such manner as to establish a connection between the plate 51 and the supporting levers of the driven roller 49 during the travel of the plate which brings the entraining elements and recording playback transducer into the working position.

Figure 6:
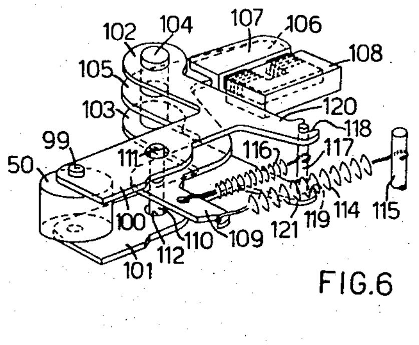
FIG. 6 is a perspective view of a second detail of the apparatus.

The driven roller 50 (FIG. 6), similarly to the roller 49, is pivoted by means of its pivot 99 in the two ends 100 and 101 of two supporting levers 102 and 103 disposed parallel and keyed on a single shaft 104 fixed rigidly to the base 29. Between the two levers 102 and 103 there is arranged an intermediate lever 105 also pivoted on the shaft 104 and having an arm 106 supporting an armature 107, the position of which is controlled by an electromagnet 108 mounted on the base 29.

An arm 109 of the intermediate lever 105 rigidly supports a spindle 110 disposed perpendicularly to the plane of the lever itself and seated at its two ends in two holes 111 and 112 formed in the supporting levers 102 and 103. A first spring 114, which acts on the lever 105, supplies a resistant force for the entire system of levers controlling the driven roller 50. A second spring 116, stretched between the end of the lever arm 109 and a cylindrical bar 117 resting at its two ends in two recesses 118 and 119 belonging to the arms 120 and 121 of the supporting levers 102 and 103, respectively, enables the independent movements of these two disjointed levers to be coordinated so as to achieve a correct positioning of the driven roller 50 against the corresponding driving roller 48. In fact, the spring 116 holds the spindle 110 so that it normally bears against the inner walls of the holes 111 and 112 (FIGS. 1 and 5), while the spring 114, stretched between the arm 109 of the lever 105 and a fixed point 115 on the base 29, holds the entire assembly, and in particular the ends 100 and 101 of the levers 102 and 103, constantly backed against a pin 123 (FIG. 1). Since the levers 102 and 103 are partially disconnected from one another and since there is a considerable play between the spindle 110 and the holes 111 and 112, the driven roller 50 can adjust itself perfectly to the driving roller 48 under the control of the spring 116.

The pin 123 (FIG. 1) is fixed to the actuating plate 51 and cooperates with the ends 100 and 101 of the levers 102 and 103 in such manner as to establish a connection between the plate 51 and the supporting levers of the driven roller 50 during the travel of the plate itself which brings the entraining elements and recording playback transducer into the working position.

In the inoperative position, the apparatus has the three command electromagnets 59, 83 and 108 deenergized, as a result of which the actuating plate 51 is at the beginning of its travel and the driven rollers 49 and 50 are considerably spaced from the corresponding driving rollers 47 and 48 (which state in shown in FIG. 1). In this position, the recording and/or playback head 62 and the light sources 63 and 64 are spaced from the tape 14.

To insert the cassette 10 in the apparatus, it is sufficient to rest its rear portion on the platform 35 and push the cassette against the frame 36 until the top edge or corner of the rear portion is pressed by the bent portion of the resilient tongue 38 (FIG. 3). The tongues 39 and 40 (FIG. 1) guide the cassette 10 during the insertion thereof and also provide for the centring thereof in the transverse direction. In this position, the cassette 10 is located with the holes 18 and 19 aligned in correspondence with the bushes 32 and 33, respectively, and with the pairs of holes 27, 28 and 25, 26 aligned in correspondence with the two pins 42 and the shafts 47 and 48, respectively.

By pressing the cassette downwardly, the toothed rings 15 and 16 of the spools 12 and 13 are brought into engagement with the toothed bushes 32 and 33 and the two pins 42 and the shafts 47 and 48 are caused to seat themselves in the respective holes 27 and 28 and 25 and 26. Moreover, in this position, the apertures 21 are located in correspondence with the driven rollers 49 and 50, the aperture 23 in correspondence with the head 62 and the apertures 22 in correspondence with the light sources 63 and 64.

The putting on of the cassette 10 and the corresponding correct positioning are therefore very simple and such as to require from the operator the use of only one hand.

By energizing the electromagnet 59, the lever 56 turns clockwise (FIG. 2) and pulls the supporting plate 51 to one end of its travel or stroke. In this position, the head 62 houses itself in the aperture 23 of the cassette 10, coming into contact with the magnetic face of the tape 14; at the same time, the light source 63 and 64 are brought into the proximity of the apertures 22.

During this shifting of the plate 51, the pins 98 and 123, cooperating with the ends 75 and 76 of the levers 77 and 78 and with the ends 100 and 101 of the levers 102 and 103, and overcoming the action of the springs 90 and 114, bring the driven rollers 49 and 50 into the proximity of the driving shafts 47 and 48. In this position, moreover, the armatures 82 and 107 are urged close to the corresponding electromagnets 83 and 108.

If it is now desired to cause the tape 14 to advance at low speed in one of the two directions of movement for recording or playback, the electromagnet 83 or the electromagnet 108 will be energized selectively to bring the roller 49 or the roller 50, respectively, into contact with the corresponding driving shaft 47 or 48.

More particularly, if it is desired to record or playback the tape 14 by transporting it in the forward direction from the spool 12 to the spool 13, the electromagnet 108 (FIG. 2) is energized and will attract the armature 107 to itself and therefore causes the clockwise rotation of the lever 105, overcoming the action of the spring 114.

With the rotation of this lever 105, the levers 102 and 103, which are pulled by the spring 116, also turn clockwise and bring the driven roller 50 into contact with the tape 14 and cause it to press against the driving shaft 48. The tape 14 will lie in the central part of the roller 50, where the covering 73 has a greater thickness, while, owing to the slight thickness of the tape, the lateral edges of the roller 50 will come into direct contact with the driving shaft 48. After the roller 50 has made pressure contact with the driving shaft 48, a consent signal is given which activates the corresponding clutch 127 inserted between the shaft 48 and the respective motor (not shown in the drawing) so as to transmit the rotation to this shaft.

At the instant when the electromagnet 108 is activated, the winding and unwinding motors connected to the shafts 30 and 31 are also commanded. More particularly, the motor corresponding to the shaft 31, which is in engagement with the spool 13 acting in this case as the winding or take-up spool, rotates in the same sense as the shaft 48, applying to this spool 13 a torque sufficient to keep the length of tape downstream of the shaft 48 under constant tension. On the other hand, the motor corresponding to the shaft 30, which is in engagement with the spool 12 acting in this case as the unwinding or feed spool, produces a torque of a sense opposite to that applied to the shaft 48, thus exerting on the spool 12 a resistant torque which keeps the length of tape between this spool 12 and the shaft 48 constantly tensioned. The tape will thus be in constant contact with the recording and/or playback head 62 and correctly wound on the take-up spool.

Since the coefficient of friction between the cylindrical surfaces of the two entraining rollers 48 and 50 is greater than the coefficients of friction between the surfaces of the entraining roller and the tape, the rotation of the driven roller 50 is effected substantially by the frictional forces which are exerted between the end zones of the directly coupled driving shaft 48 and driven roller 50. Consequently, during the phase of starting up of the tape, it will not be subjected to rubbing by the surfaces of the two rollers 48 and 50.

When the driven roller 50 is in contact with the driving roller 48, the spindle 110 (FIG. 2) is disengaged with respect to the inner walls of the holes 111 and 112 of the supporting levers 102 and 103, respectively. As a result, the resilient action exerted by the spring 116 on the roller 50 and the clearance between the spindle 110 and the holes 111 and 112 allow the driven roller 50 to adapt itself resiliently to the corresponding driving shaft 48 and, by being compressed elastically, to absorb the thickness of the tape 14 and any possible variations therein. The elastic absorption of the thickness of the tape by the rubbery layer of the driven roller forms a furrow in the surface of the roller itself which is effective for the purpose of guiding the tape, keeping it aligned with the recording and/or reading element.

Similarly, if it is desired to transfer the tape 14 at low speed from the spool 13 to the spool 12, it is sufficient to energize the electromagnet 83 and deenergize the electromagnet 108. The driven roller 49 will thus be brought into contact with the tape 14 and caused to press against the shaft 47. The considerations given hereinbefore concerning the adaptation of the tape to the driven roller and the direct coupling of the latter with the corresponding driving shaft also apply in this case. This reverse movement of the tape can be utilized, for example, to reposition the tape before repeating the reading of a block of data recorded thereon or to correct a wrong recording.

In addition to the slow movements of the tape provided for the recording and reading steps and achieved by means of the use of a pair of rollers, a driving roller and a driven roller, the apparatus can also produce fast forward or rewind movement by means of direct entrainment effected by the driving shafts 30 and 31 on the spools 12 and 13, for example in order to effect coarse positioning movements of the tape.

During this fast movement, the actuating plate must be in an inoperative position so that the head and the driven rollers will not be in contact with the tape. Normally, for the purpose of keeping the tension of the tape constant during fast winding on to the spools so as to obtain correct packing thereof, without slack or crinkled zones (which would then have an effect on the recording and reading), speed control is applied to the motors commanding the driving shafts 30 and 31.

The apparatus is also provided with a device which enables the beginning and end of the tape to be signalled photoelectrically. The beginning of the tape indicates that the apparatus is able to begin recording or reading; the end of the tape indicates that the tape has almost reached its end and consequently commands the stopping of the mechanical movement of the tape.

To this end, the light sources 64 and 63 co-operate with the phototransistors 46 to detect the passage of transparent leaders at the beginning and end of the tape 14.

Since the cassettes available commercially are symmetrical and have two pairs of recording tracks, the apparatus can have similar symmetry to enable it to perform the same functions of recording and playback on one or the other of the two pairs of tracks by loading the cassette in a marked position or in an inverted position. To this end, a signal which indicates correct loading and positioning of the cassette may be provided.

It is obvious that, instead of the apparatus described receiving the tape cassette in the horizontal position, it may have a different orientation so as to permit loading of the cassette in the vertical position.

What we claim is:

1. Apparatus for recording and/or playing back a magnetic tape contained in a removable cassette comprising:

a supporting base, cassette positioning means on said base for removably holding said cassette with a portion of said tape exposed, an actuating plate slidable on said base, a recording and/or playback head mounted on said actuating plate, positioning means connected to said actuating plate for moving said actuating plate between a rest position wherein said head is spaced from said exposed tape and an operating position wherein said head is in contact with said exposed tape, first and second oppositely rotatable drive capstans fixedly mounted on said base on one side of said exposed tape for selectively driving said tape in either direction, first and second pinch rollers on the other side of said exposed tape opposite said first and second capstans, said first and second pinch rollers being supported respectively on first and second lever means pivotally mounted on said base, each of said lever means being movable between a second position wherein the respective said pinch roller supported thereby is in an intermediate disengaged position slightly spaced from the respective said capstan and a first position wherein the respective said pinch roller supported thereby is in an engaged position in engagement with the respective said capstan with said tape captured therebetween, first and second selectively operable electromagnets operatively interconnected respectively with said first and second lever means for pivoting said lever means between said second position and said first position, and means for selectively actuating said first and second electromagnets, first and second transmission elements carried by said actuating plate and engageable with said first and second lever means to simultaneously move said lever means between a third position wherein said pinch rollers are spaced a distance farther than said intermediate disengaged position from said capstans and said second position simultaneously with the movement of said actuating plate from said rest position to said operating position, whereby the selected one of said pinch rollers can be moved said slight distance from said intermediate disengaged position to said engaged position by the respective one of said electromagnets.

2. Apparatus according to claim 1, wherein each one of said pinch rollers has a cylindrical rigid body covered by resilient rubbery material, said cylindrical body having a central portion flanked by a pair of edge portions, the cross-section of said central portion being less than the cross-section of said edge portions while the thickness of said rubbery material is correspondingly several times greater in said central portion than in said edge portion, the width of said central portion being substantially equal to the width of said tape, so that said tape lies on the more resilient part of said material defined by said central portion of said covering, said capstan and said pinch roller being in direct contact along the said edge portions whereby the entrainment of said pinch roller is effected substantially by the frictional forces which are exerted on said edge portions.

3. The apparatus according to claim 1 wherein each of said first and second lever means comprises a pair of spaced parallel levers between which said pinch roller is rotatably mounted, each said pair of levers being pivotally mounted on a common shaft attached to said base, and wherein each said electromagnet is connected to the respective said lever means by a connecting lever pivotally mounted on said base and resiliently interconnected to said lever means by a spring means.

4. Apparatus according to claim 3, wherein each of said spring means comprises a helical spring having one end attached to said connecting lever and the other end attached to a first pin mounted in two recesses on said pair of levers, wherein said connecting lever and said pair of spaced levers are mounted on a common shaft, and further comprising a second pin carried by each said connecting lever engaging a pair of aligned openings in the respective said pair of spaced levers, said openings being substantially larger than said second pin, whereby the extent of relative motion between said connecting lever and said pair of spaced levers allowed by said spring is limited by contact between said second pin and the edges of said openings.

5. Apparatus according to claim 4, wherein said transmission elements comprises a pair of transmission pins on said actuating plate to push said pair of spaced levers toward said second position, each said pair of spaced levers being biased toward said third position by second spring means connected to the respective said connecting lever.

6. In an apparatus for recording and/or playing back a magnetic tape, a device for transporting said magnetic tape comprising:

a support base, a capstan rotatable on said base, a pinch roller adapted to cooperate with said capstan to feed said tape, a pair of support levers rotatably supporting said pinch roller, common pivot means for independently pivoting said pair of supporting levers on said base, a third lever pivoting on said base, stop elements carried by said third lever and two counterstop elements carried by said support levers, spring means connecting each of said support levers with said third lever for mutually urging said stop elements toward said counterstop elements, and actuating means operating said third lever for moving said third lever between a rest position and a work position, said third lever, when in said rest position, causing said support levers to disengage said pinch roller from said capstan, said stop elements arresting then each one of said counterstop elements, and said third lever, when in said work position, causing said support levers to engage said pinch roller with said capstan, so that said pinch roller is perfectly adjusted with respect to said capstan by the action of said spring means over each of said supporting levers for a uniform transport of said magnetic tape.

7. A transport device according to claim 6, wherein said third lever is pivoted on said common shaft between said support levers, and said spring means comprise a spring stretched between said third lever and a bar on said support levers substantially parallel to said common shaft.

8. A transport device according to claim 7, wherein said stop elements comprises a pin fixed to said third lever and said counterstop elements comprise the inner surfaces of openings in said supporting levers, said openings being substantially larger than said pin.

9. A device according to claim 6, wherein said pinch roller comprises a cylindrical rigid body covered by resilient material, said cylindrical body having a central portion of reduced diameter with respect to edge portions so that thickness of said resilient material is several times greater in said central portion than in said edge portions, the width of said central portion being substantially equal to the width of said magnetic tape.

* * * * *

UNITED STATES PATENT OFFICE

CERTIFICATE OF CORRECTION

Patent No. 3,838,459 Dated September 24, 1974

Inventor(s) G. Bettini and C. Romano

It is certified that error appears in the above-identified patent and that said Letters Patent are hereby corrected as shown below:

The place of residence of inventor Carlo Romano should be Montalto Dora.

The date of the foreign priority application should be January 28, 1971.

Signed and sealed this 13th day of May 1975.

(SEAL)
Attest:

RUTH C. MASON
Attesting Officer

C. MARSHALL DANN
Commissioner of Patents
and Trademarks